3,110,927
FILM STRETCHING APPARATUS
Hugo Paul Koppehele, Glen Riddle, and Julius Zink, Springfield, Pa., assignors to Avisun Corporation, Philadelphia, Pa., a corporation of Delaware
Filed Apr. 13, 1962, Ser. No. 187,339
15 Claims. (Cl. 18—1)

The present invention relates to the manufacture of plastic films or sheets and particularly to an apparatus for stretching of crystalline polymeric materials to improve the properties thereof.

In the conventional manufacture of films from thermoplastic polymeric materials, as for example from polyethylene and polypropylene, the molten polymer is extruded as a continuous sheet and is then rapidly quenched, as for example by a cooling liquid or gas. To convert this film to a more useful article, the film is generally oriented by being stretched, preferably simultaneously, in two mutually perpendicular or biaxial directions to form a substantially balanced and superior film in which the physical properties, such as tensile strength, elongation, etc., are substantially the same as measured in both directions.

To facilitate longitudinal and transverse stretching of a continuous film, a conventional practice is to initially form the film with thickened or beaded longitudinal edges which are adapted to slidably engage with stationary metal tracks. The tracks serve to restrain the film beads against transverse movement as the film is conveyed and drawn in a longitudinal direction by a suitable take-up means which is operated at a faster rate of speed than that at which the film is delivered into the tracks. The tracks are disposed in diverging relationship when a biaxial stretching of the film is desired with the film usually being heated during the actual stretching operation, or alternatively, being preheated just prior to the stretching stage. During the stretching operation, however, considerable friction is developed between the stationary metal tracks and the film beaded edges so that this procedure has, in general, found to be unsatisfactory.

Another known stretching practice involves the use of two spaced rows of a plurality of coacting pairs of idler guide rollers which are disposed between feed and output rolls and are adapted to engage with the beaded edges of a film. The rollers in each pair are disposed at opposite angles from each other and at an angle from the plane of the film as it is advanced therealong with the axes of such rollers having an apex in the film close its beaded edge. The pairs of rollers in each row are mounted on rails which may be adjusted laterally whereby the rollers guide the beaded edges of the film along diverging paths as the film travels between the feed and output rolls.

A basic difficulty with this last described apparatus is that the beaded edges of the film often wedge between the rollers of each pair of rollers as such beaded edges move from one pair of rollers to the next. In analyzing this conventional apparatus, it has been found that during the travel of the beaded edges of the film between adjacent pairs of rollers, the film relaxes or contracts in a transverse direction. The portions of the beaded edges along such relaxed sections of the film therefore assume curvilinear paths and thus when approaching adjacent pairs of rollers such portions of the beaded edges tend to wedge or bind between the opposing peripheral edge portions thereof. This wedging tendency often results in distorting and/or tearing of the film and may actually displace a beaded edge of the film from between one or more pairs of guide rollers, especially as the width of the film which is to be stretched and/or the transverse or longitudinal stretch ratio is increased. Moreover, it has been found that reducing the size and spacing of the guide rollers and/or varying the shape of the peripheral edges thereof failed to provide for any significant improvement and often increased the tendency for the film beaded edges to be displaced from the guide means. Accordingly, a primary object of the present invention is to provide a new or generally improved apparatus for orienting thermoplastic polymeric films.

Another object is the provision of an improved stretching apparatus which includes a plurality of pairs of cooperating discs or rollers for engaging with and guiding the edges of a beaded edge film along desired paths without wedging or binding therewith.

Still another object is to provide an improved apparatus for stretching of continuous beaded edge films which includes spaced rows of pairs of cooperating discs or rollers which are adapted to engage with the film beaded edges along opposite sides of and in spaced relationship with the web thereof and guide such beaded edges along desired diverging paths.

A further object is to provide an improved apparatus for stretching of continuous beaded edge thermoplastic films which includes two spaced rows of pairs of cooperating driven discs or rollers which are adapted to engage with the beaded edges of a film and advance successive portions of the same along diverging paths and at progressively increasing speeds so as to effect simultaneous biaxial orientation of the film web.

These and other objects and advantages of the invention will be apparent from the following description and accompanying drawing in which.

Figure 1:
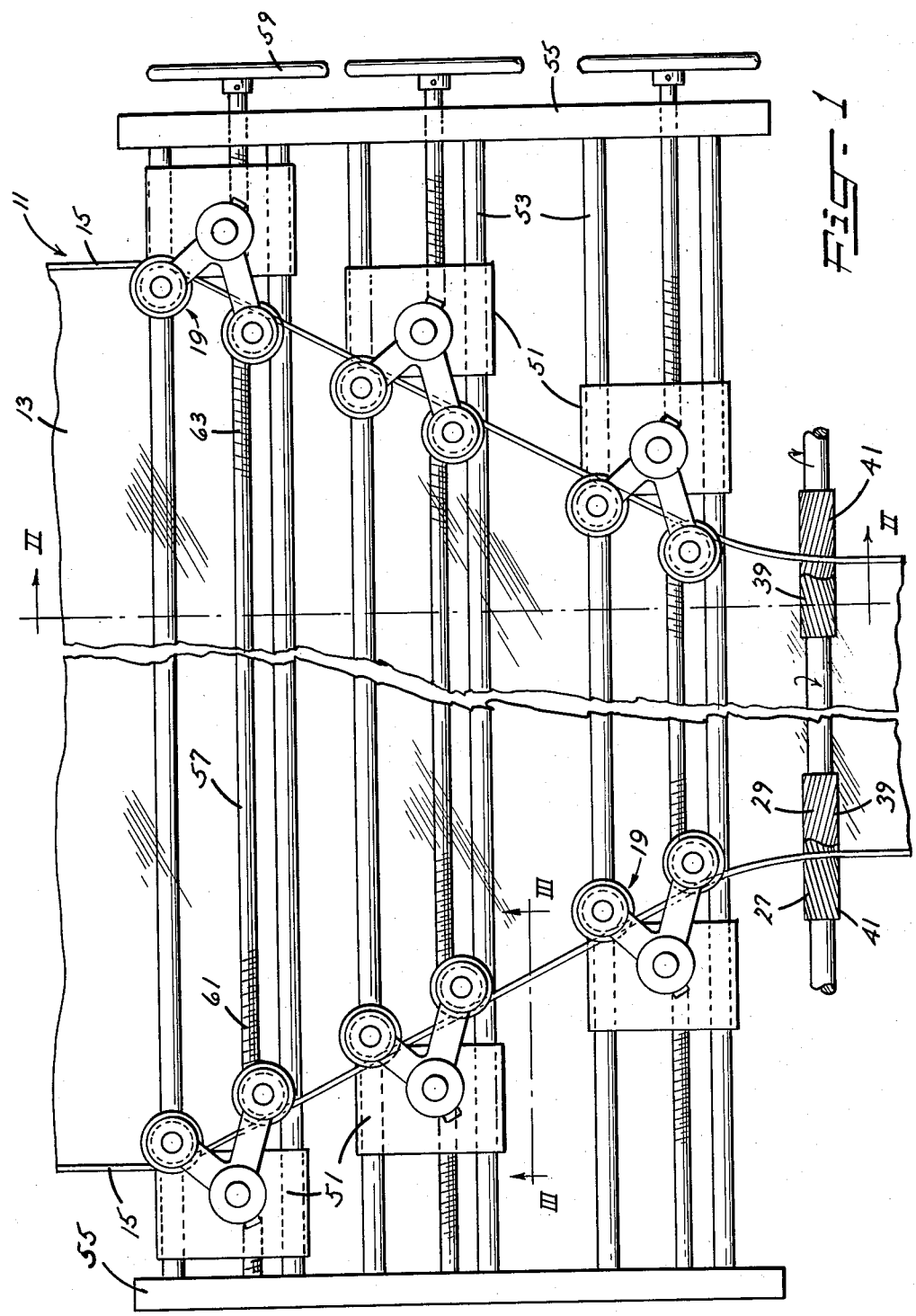
FIGURE 1 is a plan view of the apparatus of the present invention.

In general, the apparatus of the present invention includes feed rolls for delivering a continuous beaded edge film at a metered rate, pull rolls spaced from the metering rolls for advancing and preferably stretching the film longitudinally, and two spaced rows of pairs of cooperating discs or rollers disposed between the feed and pull rolls for directing the film beaded edges along desired paths. The discs of each pair of discs are disposed in spaced apart relationship to permit the film web to travel freely therebetween and are mounted on individual support arms for rotary movement about a common axis which extends centrally of such pairs of discs and substantially perpendicularly to the plane of the film web. The opposing faces of each pair of discs are formed with annular projections which are of smaller diameter than the remaining portions of such discs. During the stretching operation, the peripheral surfaces of these disc projections are engaged with the beaded edge of a film adjacent to and along opposite sides of the film web and serve to guide the same along desired paths.

As heretofore mentioned, the discs of each pair of discs are rotatably carried by individual support arms, which are in turn mounted on slide blocks. The slide blocks are adjustable transversely to the path of the film as it is advanced between the feed and pull rolls and include means which permit the respective support arms to pivot about an axis substantially parallel to the axes of such pairs of discs. For reasons as will be more apparent hereafter, the support arms of at least two adjacent pairs of discs of the same row of discs are carried by each slide block, with the lengths of such support arms being so proportioned as to exert balanced rotational torques on the film beaded edges.

With the apparatus described, the pairs of discs of each row of discs serve to guide the beaded edges of a film along desired paths as the film itself is advanced relative thereto. In this arrangement, the discs are mounted on their respective support arms for free rotary motion as induced by the movement of the film itself. If desired, at least one of the discs of each pair of discs may be driven, with corresponding pairs of discs of the two rows of discs being driven at a faster rate of speed than preceding pairs of corresponding discs so as to effect a progressive stretching of a beaded edge film in a longitudinal direction.

As will be apparent from the following detailed description the apparatus of the present invention is in no way limited to any particular film material but is useful in orienting beaded edge films formed from a variety of thermoplastic polymeric material, as for example, polypropylene, polyethylene, polyesters, etc.

With reference to the drawing, the apparatus of the present invention is designed for stretching films, such as indicated at 11, which are formed by conventional procedures and which include a web 13 of substantially uniform thickness and beaded or thickened edges 15. Such film is preferably preheated in a manner as described in the copending application of H. P. Koppehele, Serial No. 861,797, and is then delivered to the apparatus of the present invention which includes a metering device 17, a plurality of guide or stretching units or assemblies 19, a take-up means, such as pull rolls 21, and a chamber 23 which encloses at least a portion of the apparatus.

The metering device 17 serves to advance the film 11 at a uniform and predetermined rate of speed and includes a pair of metering rolls 27 and 29, a supporting frame 31 on which the roll 27 is rotatably mounted, a carriage 33 which supports the roll 29 and means, such as a conventional hydraulic cylinder 35 and piston 37, for adjusting the carriage 33 relative to the frame 31. As shown in FIGURE 1, the metering rolls 27 and 29 are formed with gripping sections 39 and 41, respectively which are adapted to engage with the film beaded edges 15 and advance the same as the metering rolls are turned by suitable means, not shown. Preferably, the peripheral surfaces of the cooperating gripping sections 39 and 41 of the metering rolls 27 and 29 are formed with helical or inclined grooves of opposite hand, as illustrated, so as to urge the film beaded edges away from each other concomitantly with their advancement.

As heretofore mentioned vertical adjustment of the carriage 33 is achieved by the hydraulic cylinder 35 and piston 37. The piston 37 is pivotally connected by a pin 43 to a yoke 45 fixed to the carriage 33 to thereby permit the carriage to tilt in response to variations in the size or shape of the respective beaded edges. Any suitable means, not shown, may be employed for delivering and discharging a hydraulic fluid to and from opposite ends of the cylinder 35, as through ports 47 and 49.

As shown in FIGURE 1, the units 19 are positioned in two spaced rows along the path of the film and serve to guide the beaded edges thereof along desired diverging paths. The guide units 19 are carried by slide blocks 51 which are in turn adjustable along rods 53 disposed between and fixed to suitable frames 55. As illustrated, each pair of aligned slide blocks, and guide units 19 carried thereby, are simultaneously adjusted toward and away from each other by a screw 57 which is rotatably mounted in the frames 55 and actuated by a hand wheel 59. The screws 57 each extend through an aligned pair of slide blocks 51 and are each provided with threads 61 and 63 of opposite pitch which mesh with corresponding threads formed in the slide blocks themselves. From the structure thus far described, it will be apparent that rotation of the individual screws 57 will cause the slide blocks connected thereto to move toward or away from each other along the rods 53.

Basically, the guide units 19 are of like construction. Each of the units includes a pair of similar crank levers 65 and 67 which are mounted for free rotation in unison about a post 69 secured to a slide block 51, as by a press fit. The crank lever 65 includes arms 71 and 73 which are of different lengths, for reasons as more fully discussed hereafter, and which carry discs or rollers 75 and 77, respectively, at their outermost ends. The crank lever 67 is similarly formed with arms 79 and 81 which also carry discs or rollers 83 and 85 at their outermost ends. The arms 79 and 81 of the lever 67 correspond with the arms 71 and 73 of the lever 65 in both length and angular relationship so that the discs 75 and 77 are disposed in opposed and aligned relationship with the discs 83 and 85, respectively.

Figure 3:
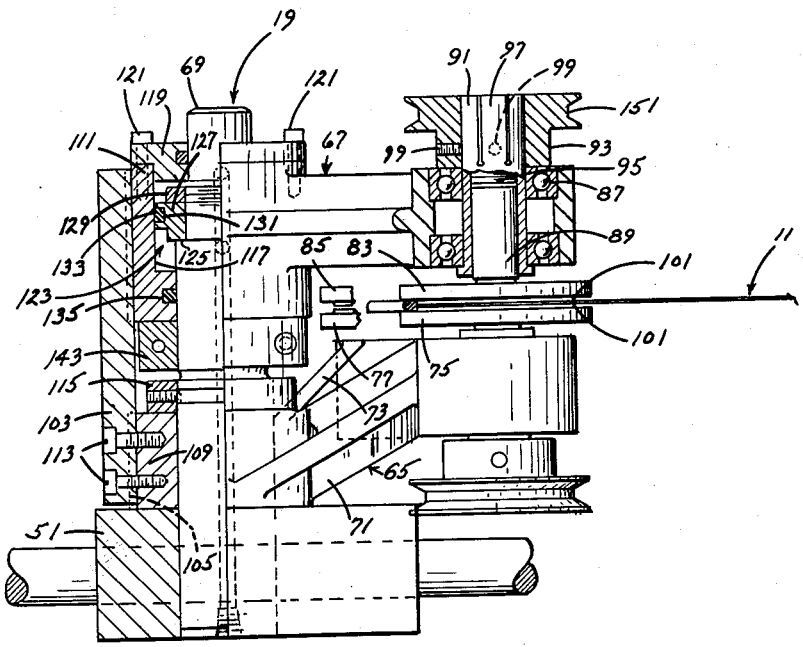
FIGURE 3 is a side view of one of the stretching units of the apparatus shown in FIGURE 1, as viewed in the direction indicated by arrows III—III, and with portions thereof shown in section.
Figure 4:
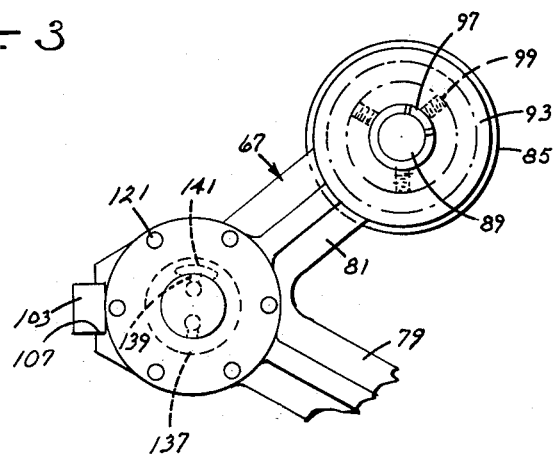
FIGURE 4 is a plan view of a portion of the unit shown in FIGURE 3.

Each of the discs 75, 77, 83 and 85 is supported from its respective lever arm in the same manner by an arrangement as shown in FIGURES 3 and 4 which includes roller bearings 87 pressed within recessed portions of the lever arm, a shaft 89 to which a disc is centrally fixed, a sleeve 91, and a locking ring 93. The shaft 89 is threaded within the sleeve 91 at 95 to permit fine adjustment of the spacing between opposing discs, and is locked in adjusted position by a slit portion 97 of the sleeve 91 which is pressed snugly against the shaft 89 by one of the series of set screws 99 threaded through the locking ring 93.

Figure 2:
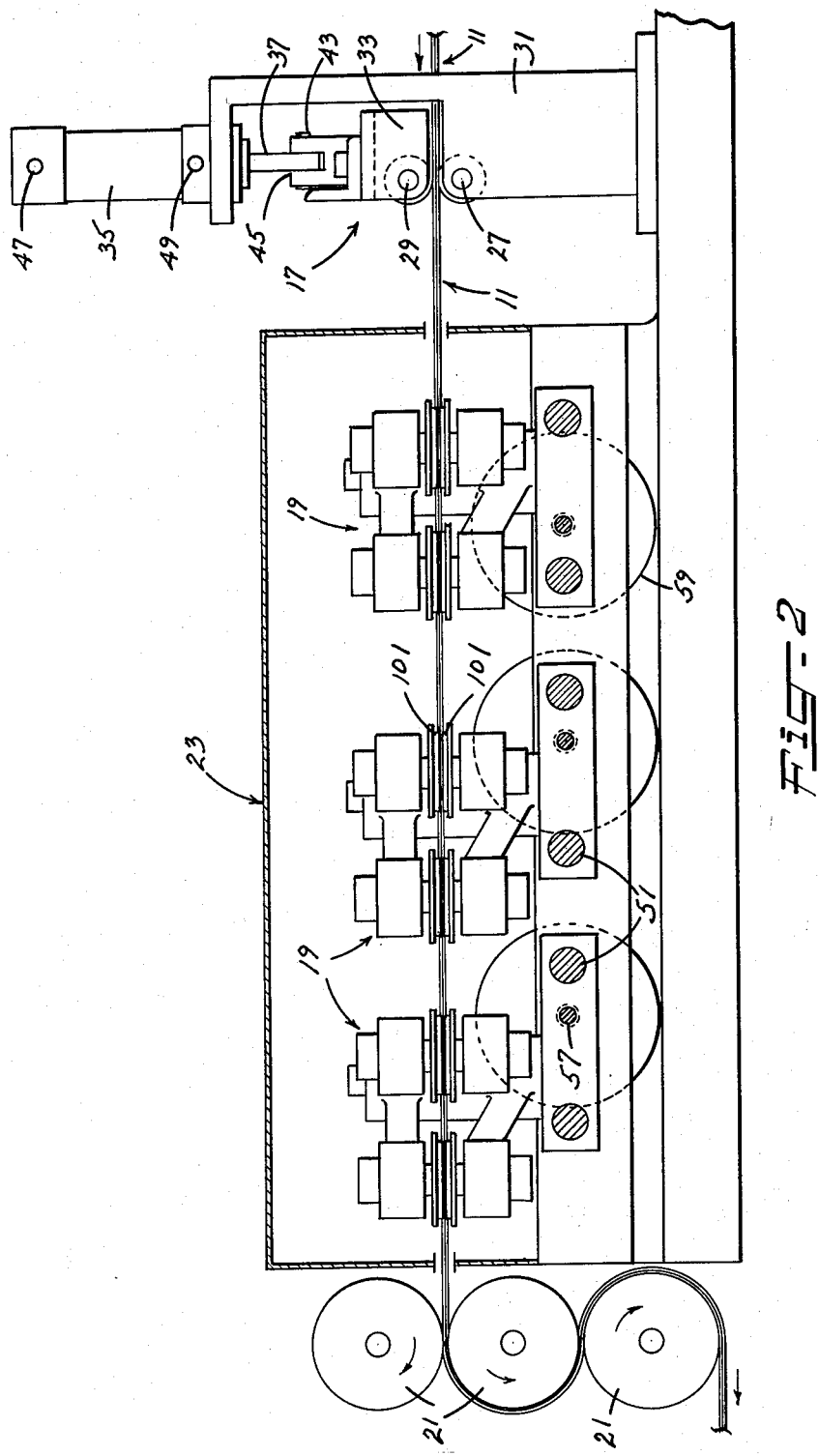
FIGURE 2 is a side view of a portion of the apparatus shown in FIGURE 1 as viewed in the direction indicated by arrows II—II.

As illustrated in FIGURES 2 and 3, each pair of cooperating discs are provided with opposed projections 101 which are of reduced diameter and which extend along planes substantially perpendicular to the axes of the respective shafts 89. The peripheral surfaces of these projections 101 are adapted to engage with the beaded edge 15 of the film adjacent to and along opposite sides of the film web 11 and may be roughtened to insure good frictional contact. The shafts 89 of each pair of cooperating discs are, of course, axially aligned and are substantially parallel to the axes of the posts 69 so that the opposing surfaces maintain the same positions relative to the film regardless of the movement of the levers 65 and 67.

To insure that each pair of cooperating levers 65 and 67 rotate in unison about their respective posts 69, a key 103 is seated within aligned slots 105 and 107 formed in hubs 109 and 111 of the respective levers. The key 103 is secured by screws 113 to the lever hub 109, which is in turn fixed against movement axially of the post 69 by a locking ring 115. The hub 111 of the lever 67, however, is mounted for slidable movement relative to the post 69 and key 103 to thus permit the lever 67 to be moved relative to the lever 65, as for example during film lacing operations.

To facilitate movement of the levers 67 axially of their respective posts 69 one end of the hub 111 of each of the levers 67 is formed with an annular chamber or recess 117 over which a plate 119 is secured by screws 121 to provide a cylinder 123. The post 69 extending up through such hub 111 is formed with a shoulder 125 against which a piston 127 is engaged by a nut 129. An annular recess 131 is formed along the periphery of the piston 127 and receives a sealing ring 133 of rubber or like material to provide for a fluid-tight but sliding seal between the piston and cylinder roll. Similar sealing rings 135 are recessed with the hub 111 and cover plate 119 to prevent fluid leakage from the opposite ends of the cylinder 123.

A fluid is delivered and discharged from opposite ends of the cylinder 123 through passages 137 and 139, the latter of which terminates in a recess 141 formed in the plate 119. The passages 137 and 139 of each of the guide units 19 are connected by flexible hoses to a conventional control system, not shown.

From the structure described, movement of the lever 67 away from the lever 65, as during film lacing operations, is achieved by delivering a fluid into the upper end of the cylinder 123 through the passage 139 while simultaneously exhausting the lower end of the cylinder 123 by means of passage 137. The pressure of the fluid in the upper end of the cylinder 123 thus causes the hub 111 to move upward along the post 69. Movement of the lever 67 toward the arm 65 is effected by reversing the flow of fluid through the respective passages 139 and 137. Preferably, a split ring 143 is releasably fixed to the posts 69 to limit the downward movement of the levers 67 and thus control the spacing between the cooperating discs.

In using the apparatus of the present invention, the levers 65 and 67 are first adjusted into spaced apart relationship, as heretofore described, after which the slide blocks 51 connected to the respective screws 57 are moved away from each other until the spacing between the two rows of pairs of discs is greater than the width of the film to be stretched. The carriage 33 is then elevated to space the feed rolls 27 and 29 after which the feed and pull rolls are set in motion.

The continuous beaded edge film 11 which is to be stretched is preferably preheated as heretofore mentioned and then laced between the feed rolls 27 and 29 and over and around the pull rolls 21. The carriage 33 is lowered until the beaded edges 15 of the film 11 are snugly gripped between the grooved portions 39 and 41 of the feed rolls.

The corresponding slide blocks 51 are then moved toward each other until the opposed projections of each pair of cooperating discs are positioned along the path of the film web 13 and well within the width of the film. With the guide units 19 in this position, the respective levers 67 are lowered against the rings 143 which have been preset on the respective posts 69 so that the spacing between the opposing projections 101 of each pair of discs is slightly greater than the thickness of the film web but less than the thickness of the film beaded edges. It will be here noted that the threaded connections between the disc shafts 89 and surrounding sleeves 91 facilitate rapid and accurate positioning of the discs relative to the plane of the film web.

The corresponding slide blocks 51 are now moved away from each other to engage the peripheral surfaces of the opposing projections 101 of each pair of discs with the beaded edges of the film. In applications where only longitudinal stretching of the film is desired, the two rows of pairs of discs would be positioned to guide the beaded edges of the film along substantially parallel paths while the pull rolls 21 are advanced at a greater speed than the feed rolls 27 and 29. On the other hand if transverse or biaxial stretching of the film is intended, the pairs of discs of the two rows of discs are positioned or shown in FIGURE 1 to guide the film beaded edges along curvilinear diverging paths, with the speed of the pull rolls 21 correlated with the speed of the feed rolls to achieve desired longitudinal tensioning of the film.

By supporting the pairs of discs of each guide unit 19 at the ends of lever arms of different lengths and by permitting such levers to rotate freely about their respective posts 69, it will be apparent that levers adjust themselves into such positions as to exert balanced rotational torques on the film beaded edges. During transverse stretching of the beaded edge film, the beaded edges are actually retained in channels formed by the discs of each pair of discs. The film web, however, is spaced from and moves freely relative to such discs. While the two rows of cooperating pairs of discs urge the film beaded edges away from each other, the pairs of discs themselves are free to rotate about their respective axes so that the beaded edges are not subjected to any excessive retarding frictional force.

From the description given above, it will be noted that the opposing faces of the projections 101 of each pair of discs remain substantially parallel to each other and the plane of the film web regardless of positions to which the levers 65 and 67 are pivoted. With this arrangement, a beaded edge of the film will move smoothly into contact with the peripheries of such disc projections 101 and without binding or wedging with the edges thereof, regardless of the degree of necking which the beaded edge film may experience in passing between adjacent pairs of discs.

As heretofore mentioned longitudinal stretching of the film may be achieved by rotating the pull rolls 21 at a faster rate of speed than feed rolls 27 and 29. Alternatively, the pairs of discs of the two rows of discs may be individually actuated so that corresponding pairs of discs are rotated at the same rate of speed but one which is greater than that of preceding pairs of corresponding discs to thus effect a sequential longitudinal stretching of the film concomitantly with its advancement. To achieve this result the rings 93, which are secured to shafts 89 of each pair of cooperating discs as heretofore explained, are formed with annular grooves 151 as shown in FIGURE 3. Such rings 93 may be then connected by belts to suitable individual drive motors, not shown, mounted on the respective slide blocks.

It is to be understood that changes and variations may be made without departing from the spirit and scope of the invention as defined in the appended claims.

We claim:

1. Apparatus for stretching a thermoplastic polymeric film having a web and beaded longitudinal edges including feed rolls, pull rolls spaced longitudinally from said feed rolls, two spaced rows of pairs of discs extending between said feed and pull rolls and positioned to engage peripheral surfaces thereof with the beaded edges of a film, and means supporting the discs of each pair of discs for rotary movement about a common axis extending centrally thereof and perpendicular to the plane of the film web as it is advanced between said feed and pull rolls.

2. Apparatus as defined in claim 1 wherein the means for supporting each pair of cooperating discs are mounted for free rotation about axes extending substantially parallel to said common axis.

3. Apparatus as defined in claim 1 further including means for rotating corresponding pairs of discs of said spaced rows of discs at the same rate of speed which is greater than preceding pairs of corresponding discs.

4. Apparatus for stretching a thermoplastic polymeric film having a web and beaded longitudinal edges including feed rolls, pull rolls spaced longitudinally from said feed rolls, two spaced rows of pairs of discs extending between said feed and pull rolls and positioned to engage with the opposite beaded edges of the film, arms supporting the discs of each pair of discs for rotary movement about a common axis extending centrally thereof and substantially perpendicular to the plane of the film web as it is advanced between said feed and pull rolls, said arms supporting the discs of each pair of discs in positions as to engage the same with the beaded edges of the film along opposite sides of and in spaced relationship with the film web, means supporting said arms for free rotary movement about an axis substantially parallel to said common axis, and means for rotating said pull rolls at a greater rate of speed than said feed rolls.

5. Apparatus for stretching a thermoplastic polymeric film having a web and beaded longitudinal edges including feed rolls, pull rolls spaced longitudinally from said feed rolls, two spaced rows of pairs of discs extending between said feed and pull rolls and positioned to engage with the opposite beaded edges of the film, arms supporting the discs of each pair of discs for rotary movement about a common axis extending centrally thereof and substantially perpendicular to the plane of the film web as it is advanced between said feed and pull rolls, said arms supporting the discs of each pair of discs in positions as to engage peripheral portions of the same with the beaded edges of the film along opposite sides of and in spaced relationship with the film web, means supporting said arms for free rotary movement about an axis substantially parallel to said common axis, and means for selectively adjusting the transverse spacing between the two rows of pairs of discs.

6. Apparatus for stretching a continuous thermoplastic film having a web and beaded longitudinal edges including feed rolls, pull rolls spaced longitudinally from said feed rolls for advancing the film at a greater rate of speed than said feed rolls, two rows of pairs of discs extending between said feed and pull rolls with the pairs of discs of one row being substantially aligned with corresponding pairs of discs of the other of such rows, arms supporting the discs of each pair of discs for rotary movement about a common axis extending centrally thereof and substantially perpendicular to the plane of the film web as it travels between said feed and pull rolls, said arms supporting the discs of each pair of discs in positions as to engage portions of the same with the beaded edges of the film along opposite sides of and in spaced relationship with the film web, pivot means supporting said arms for rotary movement about an axis substantially parallel to said common axis, and means for selectively adjusting the transverse spacing between said corresponding pairs of discs of said two rows of discs to direct the beaded edges of the film along diverging paths concomitantly with its advancement.

7. Apparatus as defined in claim 6 further including means for selectively adjusting the spacing between the discs of each pair of discs.

8. Apparatus as defined in claim 6 wherein the peripheral surfaces of the feed rolls are provided with helical grooves of opposite hand to direct the beaded edges of the film away from each other concomitantly with the feeding thereof.

9. Apparatus as defined in claim 6 wherein the opposing surfaces of the discs of each pair of discs are formed with similar annular projections which are of smaller diameter than adjacent portions of such discs whereby said adjacent portions of each pair of discs together provide a retaining channel for a beaded edge of the film as such beaded edge is engaged with the peripheral surfaces of opposing annular projections.

10. Apparatus as defined in claim 6 wherein the arms supporting the discs of the same row of discs are interconnected in groups of at least two arms, and wherein said pivot means includes posts for supporting each of said groups of arms for free rotary movement, the lengths of the respective arms of each of said groups of arms being so proportioned as to exert balanced rotational torques on the beaded edges of the film.

11. Apparatus for stretching a continuous thermoplastic film having a web and beaded longitudinal edges including feed rolls, pull rolls spaced longitudinally from said feed rolls for advancing the film at a greater rate of speed than said feed rolls, two rows of pairs of discs extending between said feed and pull rolls with the pairs of discs of one row being substantially aligned with corresponding pairs of discs of the other of such rows, pairs of arms supporting the discs of each pair of discs for rotary movement about a common axis extending centrally thereof and substantially perpendicular to the plane of the film web as it travels between said feed and pull rolls, said arms supporting the discs of each pair of discs in position for engaging with the beaded edges of the film along opposite sides of and in spaced relationship with the film web, posts supporting each pair of arms for rotary movement about an axis substantially parallel to said common axis, means providing for relative movement between the arms of each pair of arms axially along the respective posts to permit adjustment of the spacing between the discs carried thereby, a carriage for each of said posts and means for moving said carriages transversely of the path of the film to vary the spacing between said corresponding pairs of discs.

12. Apparatus as defined in claim 11 wherein said means for providing relative movement between the arms of each pair of arms and its respective post includes walls defining an annular chamber in one of said arms which is open adjacent to the periphery of said post, means projecting from the periphery of said post and into engagement with an annular fall of said chamber and means for selectively delivering a fluid to and from said annular chamber from opposite sides of said projection.

13. Apparatus for stretching a continuous thermoplastic film having a web and beaded longitudinal edges including feed rolls, pull rolls spaced longitudinally from said feed rolls, means for rotating the pull rolls at a greater rate of speed than said feed rolls, two rows of pairs of discs extending between said feed and pull rolls with the pairs of discs of one row being substantially aligned with corresponding pairs of discs of the other of such rows, a plurality of pairs of crank levers each having a hub and a pair of arms of different lengths, a post supporting each pair of levers for free rotary movement about an axis extending substantially perpendicular to the plane of the film web as it is advanced between said feed and pull rolls, means interconnecting the levers of each pair of levers with the corresponding arms thereof in aligned relationship, said corresponding arms of each pair of levers supporting opposing discs of said pairs of discs for rotary movement about an axis extending substantially centrally thereof and parallel to the axes of said posts, means for providing relative movement between interconnected levers axially of the respective posts to permit the disc carried thereby to engage with the beaded edges of the film along opposite sides of and in spaced relationship with the film web, a carriage for each of said posts, and means for adjusting said carriages transversely of the path of the film.

14. Apparatus as defined in claim 13 wherein said means for providing relative movement between interconnected levers includes walls defining a chamber in one of the lever hubs, said chamber extending about and being open adjacent to the periphery of the post supporting such levers, means forming a piston secured to and projecting from the periphery of said post into engagement with an annular wall of said chamber, and means for delivering a fluid to and from said chamber at opposite sides of said piston.

15. Apparatus as defined in claim 13 further including means for rotating said corresponding pairs of discs at an equal but greater rate of speed than preceding pairs of corresponding discs.

References Cited in the file of this patent

UNITED STATES PATENTS

| 3,063,090 | Koppehele | Nov. 13, 1962 |
| 3,078,504 | Koppehele | Feb. 26, 1963 |

FOREIGN PATENTS

| 1,091,716 | France | Apr. 14, 1955 |